United States Patent Office 3,663,491
Patented May 16, 1972

3,663,491
ADHESIVE OF A POLYMER LATEX, A RESOL RESIN AND A NOVOLAK RESIN
Richard W. Kibler, Cuyahoga Falls, Ohio, assignor to The Firestone Tire & Rubber Company, Akron, Ohio
No Drawing. Original application Oct. 27, 1967, Ser. No. 678,517, now Patent No. 3,547,729, dated Dec. 15, 1970. Divided and this application Mar. 2, 1970, Ser. No. 18,776
Int. Cl. C08g 51/24
U.S. Cl. 260—29.3
8 Claims

ABSTRACT OF THE DISCLOSURE

Natural and synthetic rubbers and mixtures thereof are adhered to fabrics such as polyester tire cords, by an adhesive of a resol condensation product, a novolak resin and a latex of a polymer of a conjugated diene monomer and an unsubstituted or alkyl-substituted monovinylpyridine such as disclosed in Mighton U.S. Reissue Patent 23,451, which polymer preferably also includes styrene. The invention includes the adhesive, fabrics coated with the adhesive and with a rubber vulcanized thereto, the method of producing the adhesive and the method of treating the fabric and adhering rubber to it.

---

This application is a division of my application Ser. No. 678,517 filed Oct. 27, 1967 and now U.S. Pat. 3,547,729.

The invention relates to an adhesive for bonding a rubber to fabric, and particularly tire cords, in the manufacture of pneumatic tires. The adhesive includes a polymer latex, a resol condensation product, and a novolak resin. The latex is a polymer of a conjugated diene monomer and an unsubstituted or alkyl-substituted monovinylpyridine, such as disclosed in Mighton U.S. Reissue Patent 23,451, which is included herein by reference, for its disclosure of polymer latexes. The preferred polymer is a terpolymer which includes styrene. The invention includes the adhesive, its preparation, adhesive-heated fabric, such fabric (particularly tire cords) to which a rubber is bonded, the method of adhering rubber to a fabric and commercial products, such as tires comprising textile cords or fabric bonded to a rubber. Although the invention relates more particularly to the use of the adhesive in the manufacture of tires, it can be used in the manufacture of hose, belting and other rubber-reinforced products.

Phenol-aldehyde resins have been used extensively for the adhesion of rubbers to fabrics, and particularly in the manufacture of tires. Rubber such as a terpolymer of butadiene, styrene and vinyl pyridine has been used in such adhesives.

As an illustration of prior-art patents which employ rubbery terpolymer adhesives, reference is made to Wolfe 2,817,616 and Wilson 2,652,353 which employ a butadiene/styrene/vinyl pyridine terpolymer as an adhesive component. The amount of terpolymer latex in Wilson's final adhesive composition is chosen so that the rubber-to-resin ratio is from 6:1 to 2:1 parts by weight.

We are concerned here with a resol condensation product containing hydroxymethyl groups which serves as a methylene donor, and a novolak resin which contains no hydroxymethyl end groups and serves as a methylene acceptor. The adhesive composition includes a vinyl-pyridine polymer latex and the system must remain stable so that no coagulation or gelling occurs. The preferred weight ratio of polymer to resol is 4.5:1 but, more generally, this ratio may range from about 2 to 10:1. The preferred weight ratio of novolak to resol is 5.4:1 but may range from 1 to 8:1. Thus the ratio of polymer to total resin may range from 2:9 to 5:1.

PHENOL-ALDEHYDE CONDENSATION PRODUCTS

Resol resin

In forming the resol, formaldehyde is preferably used as the aldehyde and resorcinol is preferably used as the phenol. Other aldehydes including acetaldehyde, etc. and other phenols including pyrogallol may be used, at least in part, but it is necessary that the resol be water soluble. Preferably two mols of ammonia per mol of resorcinol content are added to the novolak resin additive prior to mixing with the resol and vinyl-pyridine polymer latex mixture. If the rubber to resol ratio becomes too high (>10/1), the dip containing the novolak becomes unstable. Preferably the molar ratio of formaldehyde to resorcinol in the resol may vary from about 1.2 to 1.4:1.0. Variation of this ratio either to levels higher than 1.4/1.0 for example to 1.8 and higher: 1.0 or to levels lower than 1.2/1.0 for example to 0.8/1.0 results in poorer adhesion properties. Also as the molar ratio of formaldehyde to resorcinol in the resol component drops below 1.2:1.0, less ammonia can be tolerated in the system because of instability. For example, at a ratio of 0.8/1.0 only one-fourth as much ammonia can be tolerated in the system because of instability compared to a ratio of 1.2/1.0. When lower ammonia levels are used, adhesion properties are not enhanced but tend to fall off. If ammonia is left out of the system and the pH is adjusted to 9.2 (the original pH of the resol-vinyl pyridine mixture) with caustic soda, poorer adhesion properties result.

The resol is prepared in aqueous solution, preferably at room temperature, from about 15 to 22° C. Usually, although not necessarily, an alkaline catalyst, preferably sodium hydroxide, is used, and ordinarily it is used in the ratio of 1 mole or less than 1 mole of sodium hydroxide to 5 moles of resorcinol. The resulting product has a solids content of about 6 percent composed of products of the following formulae:

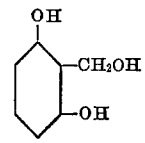 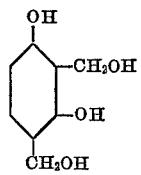

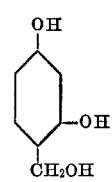 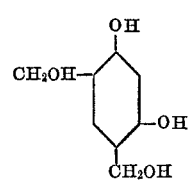

Novolak resin

The novolak resin is a linear resin preferably derived from formaldehyde and resorcinol in order to obtain a novolak which is water soluble. Other aldehydes (e.g. acetaldehyde, chloral, etc.) and other phenols (including phenol, pyrogallol, etc.), may be used in amounts which do not interfere with the water-solubility of the resin. The resin is not by itself heat hardenable and depends upon interaction with the resol for developing a thermosetting condition during cord treatment. It is necessary to split out water from the condensation reaction of formaldehyde and resorcinol in order to form novolak resin. Accordingly, reaction temperatures above room-temperatures are required for commercial operations.

Reaction will proceed in the absence of a catalyst, but the presence of a carboxylic or mineral acid speeds up the reaction. In any event the condensation reaction takes place at a pH below 7. The novolak resin is formed in a concentrated aqueous solution as compared with the resol resin, which is readily formed in dilute solutions.

The preferred molar ratio of formaldehyde to resorcinol is 0.7:1 and the reaction is preferably carried out at a temperature approaching 100° C., and preferably about 95° C., preferably in the absence of a solvent. The molar ratio may vary somewhat between 0.5 to 0.9 mole of formaldehyde to 1 mole of resorcinol. Heating is continued for several hours to complete the reaction, and the reaction mixture is then diluted with water, the temperature is brought to about room temperature, and preferably ammonia is added in the amount of up to 2 moles per mole of resorcinol content of the resin. The ammonia improves the stability of the final dip and helps to water-solubilize the novolak. The resin composition preferably has a solids content of about 19–20 percent and can be stored until added to the polymer-resol dip (referred to as RFL), as described below.

The novolak resin has the following formula:

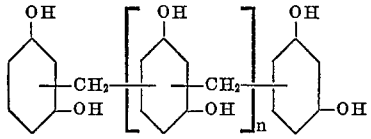

in which $n$ is a small number averaging about 1 to 3, which indicates that the resin is a mixture of molecules of relatively low molecular weight constituting a water-soluble resin mixture.

The polymer latex

Although a styrene/butadene/vinyl pyridine terpolymer is preferred, any of the polymer latexes of Mighton U.S. Reissue Patent 23,451 may be employed. Butadiene is the preferred diene, and the polymer need not include styrene. (The "butadiene" to which this specification refers is butadiene-1,3.) The preferred vinyl pyridine is 2-vinyl pyridine although 4-vinyl pyridine or any of the pyridine derivatives of Mighton U.S. Reissue Patent 23,451 and mixtures thereof may be used; and isoprene may be used instead of butadiene as there disclosed. Homologues of styrene may be used.

Due to the cost of the vinyl pyridines and their derivatives, usually a small amount such as 0.5 to 10 weight percent of the polymer will be used although as much as 25 weight percent may be employed. The amount of styrene may vary from 0 to 30 percent. The amount of butadiene or isoprene will vary from about 45 to 99.5 weight percent, being 75 to 99.5 weight percent if no styrene is present, and about 45 to 99 weight percent if styrene is present.

A preferred polymer (rubber) latex is the terpolymer composed of 68.5 weight percent butadiene, 24 weight percent styrene, and 7.5 weight percent of vinyl pyridine with a solids content of about 40 percent.

Mixing the resol, novolak and latex

To prevent coagulation, the polymer latex and resol are first mixed and then aged for a period of about 24 hours, more or less, and then the novolak solution is added with stirring to the aged RFL mixture. The ratio of the solids of the latex to the resol is preferably about 4.5:1, but may vary over a wide range. Some novolak is required to obtain good adhesion, and in a preferred adhesive about 50 percent by weight of the total solids is novolak. As the ratio of polymer to resol is increased, the amount of novolak that can be tolerated becomes less because of coagulation when all three components are present. In a preferred dip the solids content is proportioned in the following ratio, the percentages being parts by weight:

| | Percent |
|---|---|
| Polymer | 8.22 |
| Novolak | 10.0 |
| Resol | 1.78 |

The ratio of the novolak to resol may vary from about 1:1 to 8:1, but preferably is in the range of about 2:1 to 5.5:1.

When the total solids of the final dip is 19–20 percent the combined level of resol plus novolak may vary from 3.3–16.4 percent and preferably 8–12 percent. The ratio of the polymer to the combined weight of the resol and novolak varies from about 0.2 to 5:1 and is preferably about 0.7:1. Thus the amount of resin (resol and novolak) used is much larger compared to the amount of solids in the latex, than is customary in those adhesives which employ polymer and resol alone.

Treatment of tire cords

The adhesive can be used in the treatment of nylon and rayon or any other cord and cords of mixed fibers, although it has been developed particularly for the treatment of polyester cords and the tests described below refer to adhesion to such cords. The following tests were conducted on single cords of a polyester, namely poly(ethylene terephthalate), treated on a Litzler Computreater in which a single cord is dipped into the adhesive dip and treated in a series of three ovens. Commercially, a comparable treatment will be employed. The dipping treatment is limited to a matter of seconds to give uniform wetting of the cord surface. The cord is then treated by passing through the first oven which is at a lower temperature than the other two ovens, where the cord remains for a sufficient time to drive off substantially all of the moisture in the adhesive. The temperature may, for example, be 350° F. and the dwell time may be 100–300 seconds. In the second and third ovens the temperature is higher, for example, 450–475° F. and the dwell time in each oven is about 25.75 seconds. Commercially the two treatments at the higher temperature may be combined. It is even possible to use a single oven in which the tire fabric is first dried and then with continued heating the adhesive is cured to produce a thermoset resin-polymer coating. Generally, this coating is not as stiff as that produced with other phenol-aldehyde-latex adhesives. The coating forms a strong bond with synthetic and natural rubbers and mixtures thereof.

An unvulcanized rubber compound which contains curing ingredients is then applied to the tire core and is cured under pressure under conditions usual in tire presses and in the results reported in the two tables a skim stock composed of rubber, carbon black, sulfur, zinc oxide, accelerator and antioxidant was applied to the treated cord under pressure and cured for 35 minutes at 300° F. It is understood that curing for different times and temperatures can be used to give satisfactory results, depending upon the nature of the rubber and the compound used. The adhesion results recorded in the table were obtained with heated samples produced by heating in an oven for 30 minutes at 230° F. and the heated samples were then subjected to the well-known "H" pull-out test for adhesion, which is described in India Rubber World, 113–114 (1945–46), pp. 213–217.

The following examples illustrate various adhesive compositions, employing terpolymers which are preferred types of polymer latexes. Not all of the results were entirely satisfactory for reasons stated.

Example A.—Preparation of novolak resin

Resorcinol (625.0 g., 5.68 moles) and (126.0 g.) 37 percent aqueous formaldehyde (46.6 g. CH$_2$O, 1.55 moles) are charged to a 5-liter 3-neck flask equipped with stirrer, thermometer, dropping funnel and condenser. The mixture is heated with stirring to 95° C. in 50 minutes and stirred for 1 hour at 95° C.

An additional 186.0 g. of 37 percent aqueous formaldehyde (68.8 g. $CH_2O$) (2.29 moles) is added dropwise over a 35-minute period at 95° C. and stirring continued for an additional 30 minutes at 95° C. Oxalic acid (5.0 g.), used as catalyst, is then added and stirring continued for 2 hours at 95° C. to complate the reaction and formation of the novolak.

Water (2070 ml.) is added slowly with stirring over a 25-minute period while the batch is cooled from 95° C. to 20° C. Concentrated aqueous ammonium hydroxide (690 g.) is then added slowly with stirring over a 20-minute period while the temperature is maintained at 20° C. The batch is stirred for 30 minutes at 20° C. and then bottled.

Total weight of batch—3702 g. (about 1 gal.)
Mole ratio $CH_2O$/resorcinol—0.68/1.0.
Mole ratio $NH_3$/resorcinol—approx. 2.0/1.0

Example B.—Preparation of resol resin

Resorcinol (16.4 g., 0.149 mole) is dissolved in 332.7 g. of water. To this is added 14.5 g. of 37 percent aqueous formaldehyde (5.36 g. $CH_2O$, 0.178 mole) followed by the addition of 2.4 g. of 50 percent sodium hydroxide. The resulting mixture is slowly stirred for a period of 30 minutes while the temperature rises from 16° C. to 22° C. The reaction mixture is then added to vinylpyridine terpolymer latex as described in Example C.

Total weight of batch, g. _____ 366.0
Mole ratio $CH_2O$/resorcinol _____ 1.19/1.0
Mole ratio NaOH/resorcinol _____ 1/5

Example C.—Preparation of resorcinol, formaldehyde, vinyl pyridine terpolymer dip (RFL)

The resol solution (366.0 g.) described in Example B immediately is added slowly with stirring to 244 g. of vinylpyridine, styrene, butadiene terpolymer latex (41% solids). The mixture (referred to herein as RFL) is stirred for 10 minutes at room temperature and aged for 24 hours.

Total weight of batch, g. _____ 610
Percent rubber _____ 16.4
Percent resol resin _____ 3.57
Ratio terpolymer/resin _____ 4.68/1.0

The polymer of this example was composed of 7.5 parts of 2-vinylpyridine, 24 parts of styrene and 68.5 parts of butadiene.

PREPARATION OF NOVOLAK-RFL DIP, FORMULATION VARIATIONS

Example 1

Four hundred grams of 20 percent novolak solution described in Example A is added slowly with stirring to 400 g. of RFL dip, aged one day, described in Example C. The mixture is stirred for 10 minutes at room temperature and has the following characteristics:

Percent novolak _____ 10.00
Percent resol _____ 1.80
Percent terpolymer _____ 8.20

Total solids _____ 20.00

Ratio novolak/resol _____ 5.61/1.0
Ratio terpolymer/resol _____ 4.60/1.0
Ratio terpolymer/total resin _____ 0.69/1.0

The solids contents may vary. Either the solution of the novolak resin or the resol resin may be diluted with water, or the final novolak-RFL dip may be diluted; or somewhat less water may be used. The solids content of the novolak-RFL dip will generally range from about 10 to 30 weight percent, more or less. Different novolak-RFL dips were prepared using different amounts of novolak described in Example A, resol described in Example B, and terpolymer described in Example C, resulting in final dips having the following dip characteristics:

Example 2

Percent novolak _____ 5.35
Percent resol _____ 5.35
Percent terpolymer _____ 8.0

Percent total solids _____ 18.7

Ratio novolak/resol _____ 1.0/1
Ratio terpolymer/resol _____ 1.5/1
Ratio terpolymer/total resin _____ 0.75/1

Example 3

Percent novolak _____ 8.0
Percent resol _____ 3.6
Percent terpolymer _____ 8.0

Percent total solids _____ 19.6

Ratio novolak/resol _____ 2.2/1
Ratio terpolymer/resol _____ 2.2/1
Ratio terpolymer/total resin _____ 0.69/1.0

Example 4

Percent novolak _____ 10.64
Percent resol _____ 1.33
Percent terpolymer _____ 8.0

Percent total solids _____ 19.97

Ratio novolak/resol _____ 8/1
Ratio terpolymer/resol _____ 6/1
Ratio terpolymer/total resin _____ 0.67/1

Example 5

Percent novolak _____ 4.0
Percent resol _____ 4.0
Percent terpolymer _____ 12.0

Percent total solids _____ 20.0

Ratio novolak/resol _____ 1.0/1.0
Ratio terpolymer/resol _____ 3.0/1.0
Ratio terpolymer/total resin _____ 1.5/1.0

Example 6

Percent novolak _____ 5.52
Percent resol _____ 2.48
Percent terpolymer _____ 12.0

Percent total solids _____ 20.0

Ratio novolak/resol _____ 2.22/1
Ratio terpolymer/resol _____ 4.8/1.0
Ratio terpolymer/total resin _____ 1.5/1.0

Example 7

Percent novolak _____ 6.75
Percent resol _____ 1.25
Percent terpolymer _____ 12.0

Percent total solids _____ 20.0

Ratio novolak/resol _____ 5.4/1
Ratio terpolymer/resol _____ 9.6/1
Ratio terpolymer/total resin _____ 1.5/1.0

Specimens of polyester tirecord (1000/3 denier) dipped in the above described dips and then cured in rubber, as described, were treated on the Litzler Computreater and the results are recorded in Table I. This is a single-dip procedure, and excellent adhesions were obtained. Different hot-zone treatments were applied to samples prepared according to the different examples.

TABLE I

| DIP | Treating conditions | | | | | | | | | Adhesion (lbs./inch)[1] |
|---|---|---|---|---|---|---|---|---|---|---|
| | Temp. °F. | | | Time (secs.) | | | Percent stretch | | | |
| | Zone 1 | Zone 2 | Zone 3 | Zone 1 | Zone 2 | Zone 3 | Zone 1 | Zone 2 | Zone 3 | |
| Example: | | | | | | | | | | |
| 1 | 350 | 455 | 455 | 120 | 75 | 75 | 1 | 0 | 0 | 70 |
|   | 350 | 475 | 475 | 120 | 75 | 75 | 1 | 0 | 0 | 78 |
| 2 | 350 | 455 | 455 | 120 | 75 | 75 | 1 | 0 | 0 | 55 |
|   | 350 | 475 | 475 | 120 | 75 | 75 | 1 | 0 | 0 | 64 |
| 3 | 350 | 455 | 455 | 120 | 75 | 75 | 1 | 0 | 0 | 49 |
|   | 350 | 475 | 475 | 120 | 75 | 75 | 1 | 0 | 0 | 59 |
| 4 | 350 | 455 | 455 | 120 | 75 | 75 | 1 | 0 | 0 | 42 |
|   | 350 | 475 | 475 | 120 | 75 | 75 | 1 | 0 | 0 | 61 |
| 5 | 350 | 455 | 455 | 120 | 75 | 75 | 1 | 0 | 0 | 44 |
|   | 350 | 475 | 475 | 120 | 75 | 75 | 1 | 0 | 0 | 56 |
| 6 | 350 | 455 | 455 | 120 | 75 | 75 | 1 | 0 | 0 | 72 |
|   | 350 | 475 | 475 | 120 | 75 | 75 | 1 | 0 | 0 | 70 |
| 7 | 350 | 455 | 455 | 120 | 75 | 75 | 1 | 0 | 0 | 42 |
|   | 350 | 475 | 475 | 120 | 75 | 75 | 1 | 0 | 0 | 71 |

[1] "H" test, pulled at 230° F.

Examples 1–4 use dips containing 19–20 percent of total solids with a terpolymer content of about 8 percent and a terpolymer to total resin ratio of about 0.7/1.0. The terpolymer to resol ratio is varied from 1.5/1.0 to 6.0/1.0 with the optimum adhesion obtained with a terpolymer to resol ratio of 4.6/1.0 (Example 1) and a novolak/resol ratio in the 5.6/1.0 range.

and above. The table also refers to the molar ratio of ammonia to resorcinol used in the preparation of the novolak. The ammonia is added to the novolak solution as illustrated in Example A.

Several tests were run with each of the preferred adhesives giving results within the indicated range.

TABLE II

| DIP | Percent of— | | | Total solids | Mole ratio of formaldehyde to resorcinol | | Mole radio ammonia to resorcinol in novolak | Adhesion[1] (lbs./inch) "H" test, pulled at 230° F. |
|---|---|---|---|---|---|---|---|---|
| | Novolak | Terpolymer | Resol | | Novolak | Resol | | |
| Modification: | | | | | | | | |
| A | 10.0 | 9.8 | 1.89 | 21.7 | 0.68/1.0 | 2.6/1.0 | 2/1 | 23 |
| B | 10.0 | 8.2 | 2.15 | 20.35 | 0.68/1.0 | 2.2/1.0 | 2/1 | 20 |
| C | 10.0 | 8.2 | 2.0 | 20.2 | 0.68/1.0 | 1.8/1.0 | 2/1 | 27 |
| D | 10.0 | 8.2 | 1.86 | 20.0 | 0.68/1.0 | 1.4/1.0 | 2/1 | 50–70 |
| Example 1 | 10.0 | 8.2 | 1.80 | 20.0 | 0.68/1.0 | 1.2/1.0 | 2/1 | 50–70 |
| Modification: | | | | | | | | |
| E | 10.0 | 8.2 | 1.80 | 20.0 | 0.68/1.0 | 1.2/1.0 | 1/1 | 36 |
| F | 10.0 | 8.2 | 1.80 | 20.0 | 0.68/1.0 | 1.2/1.0 | 0.5/1 | 42 |
| G | 10.0 | 8.2 | 1.80 | 20.0 | 0.68/1.0 | 1.2/1.0 | [2] None | 29 |
| H | 10.0 | 8.2 | 1.80 | 20.0 | 0.68/1.0 | 0.8/1.0 | [2] None | 29 |
| I | 10.0 | 8.2 | 1.80 | 20.0 | 0.68/1.0 | 0.8/1.0 | [3] 0.5/1.0 | 36 |

[1] Treating conditions, polyester tirecord, 1,000/3 denier:

| Zone | 1 | 2 | 3 |
|---|---|---|---|
| Time (seconds) | 200 | 50 | 50 |
| Temperature, °F | 350 | 475 | 475 |
| Percent stretch | 4 | 1 | −1 |

[2] NaOH was added to bring pH to 9.2.
[3] Higher levels of ammonia cause coagulation of the dip below 1.2/1.0 mol ratio of formaldehyde to resorcinol in resol component.

Examples 5–7 use dips containing a total solids of 20 percent and a terpolymer content in the 12 percent range. They have a terpolymer to total resin ratio of 1.5/1.0. The terpolymer to resol ratio is varied from 3.0/1.0 to 9.6/1.0 with the optimum adhesion in the 4.8/1.0 range (Example 6) and a novolak/resol ratio in the 2.2/1.0 range. The terpolymer to resol ratio giving optimum adhesion was in the same range as Example 1.

Examples 1–7 illustrate that a preferred dip contains about 20 percent total solids with a terpolymer to total resin ratio in the 0.7/1.0 to 1.5/1.0 range and a terpolymer to resol ratio in the 4.5–5.0/1.0 range.

The resol of Example B, used to prepare the preferred final dips of Example 1 as well as the dips of Examples 2–7 is made with a mole ratio of formaldehyde to resorcinol of approximately 1.2/1.0. This ratio is critical and the preferred range is 1.2/1.0 to 1.4/1.0. Any substantial lowering of this ratio for example to 1.0/1.0 or 0.8/1.0 results in instability of the final dip system unless a much lower ammonia level is used. However, the net effect of this is a lowering of adhesion properties. Also any substantial increase of this ratio results in a loss of adhesion. This is illustrated in Table II in which the formulations are substantially the same as in Example 1 except that the molar ratio of formaldehyde to resorcinol in the resol preparation in the various modifications has been changed from that used in Example B to 0.8/1.0 and to 1.4/1.0

In addition to loss of adhesion as the molar ratio of formaldehyde to resorcinol is increased substantially above 1.4/1.0 in the resol, there occurs an increased stiffening of the cord which is objectionable in manufacturing operations using the treated cord.

I claim:

1. An adhesive with a solids content of substantially 10 to 30 percent, which adhesive comprises polymer latex, a resol resin and a novolak resin, the polymer latex being derived from (a) 0.5 to 25 weight percent of a vinyl pyridine of the class consisting of 2-vinyl pyridine and 4-vinly pyridine and alkyl derivatives thereof in which the alkyl substitution contains 1 to 8 carbon atoms, (b) 45 to 99.5 weight percent of a conjugated diene monomer of 4 to 5 carbon atoms, and (c) 0 to 30 weight percent of a monomer of the class consisting of styrene, alpha-methylstyrene, vinyltoluenes and mono-chlorinated styrenes the ratio of the polymer to the total resin being 2:9 to 5:1, and the ratio of novolak resin to the resol resin being 1/1 to 8/1, the novolak resin being the condensate of 0.5 to 0.9 mole of formaldehyde to 1 mole of resorcinol reacted at a pH below 7, and the resol resin is the reaction product of 0.8 to 3 moles of formaldehyde and 1 mole of resorcinol reacted at a pH of 7 or above.

2. The adhesive of claim 1 in which no component (c) is present and 75 to 99.5 weight percent of diene is present.

3. The adhesive of claim 1 in which component (c) is styrene which is present together with 45 to 99 weight percent of diene.

4. The adhesive of claim 3 in which the diene is butadiene-1,3.

5. The adhesive of claim 1 in which the novolak resin is the reaction product of 0.7 mole of formaledhyde with 1 mole of resorcinol and the resol resin is the reaction product of 1.2 moles of formaldehyde with 1 mole of resorcinol.

6. The adhesive of claim 5 in which in the preparation of the novolak resin, to the reaction product of formaldehyde and resorcinol, ammonia is added.

7. The combination of claim 3 in which the vinyl pyridine in the terpolymer is 2-vinyl pyridine.

8. The adhesive of claim 3 which contains substantially (a) 8.22 percent of terpolymer, dry basis, (b) 10.0 percent novolak resin in which ammonia is added to the reaction product of the formaldehyde and resorcinol and (c) 1.78 percent resol resin.

References Cited

UNITED STATES PATENTS

| | | | |
|---|---|---|---|
| 3,424,608 | 1/1969 | Marzocchi et al. | 260—29.3 |
| 3,437,122 | 4/1969 | Gils | 260—29.3 |
| 3,476,642 | 11/1969 | Berg et al. | 260—29.3 |
| 3,396,065 | 8/1968 | Ney | 260—29.3 |
| 3,410,818 | 11/1968 | Yurcick et al. | 260—29.3 |
| 3,525,703 | 8/1970 | Iwami et al. | 260—29.3 |
| 3,547,729 | 12/1970 | Kibler | 260—29.3 |

DONALD J. ARNOLD, Primary Examiner

U.S. Cl. X.R.

156—331; 260—845